United States Patent
Lim

(10) Patent No.: US 11,256,370 B2
(45) Date of Patent: Feb. 22, 2022

(54) TOUCH SENSING DEVICE AND TOUCH SENSING METHOD

(71) Applicant: SILICON WORKS CO., LTD., Daejeon (KR)

(72) Inventor: Yang Been Lim, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/110,851

(22) Filed: Dec. 3, 2020

(65) Prior Publication Data

US 2021/0191599 A1  Jun. 24, 2021

(30) Foreign Application Priority Data

Dec. 18, 2019  (KR) .................. 10-2019-0169791

(51) Int. Cl.
*G06F 3/041* (2006.01)
*G06F 3/044* (2006.01)
*G09G 3/36* (2006.01)

(52) U.S. Cl.
CPC .......... *G06F 3/04186* (2019.05); *G06F 3/044* (2013.01); *G09G 3/3674* (2013.01); *G09G 3/3685* (2013.01)

(58) Field of Classification Search
CPC ... G06F 3/04186; G06F 3/044; G09G 3/3685; G09G 3/3674
See application file for complete search history.

(56) References Cited

U.S. PATENT DOCUMENTS

| 10,042,484 | B1* | 8/2018 | O'Connor | G06F 3/04186 |
|---|---|---|---|---|
| 10,768,766 | B2* | 9/2020 | Lee | G06F 3/0445 |
| 2011/0096011 | A1* | 4/2011 | Suzuki | G06F 3/0418 345/173 |
| 2012/0313861 | A1 | 12/2012 | Sumi et al. | |
| 2014/0168171 | A1* | 6/2014 | Oh | G06F 3/04186 345/178 |
| 2015/0169123 | A1* | 6/2015 | Lee | G06F 3/0446 345/174 |
| 2015/0184991 | A1* | 7/2015 | Nakabayashi | G06F 3/044 345/174 |

(Continued)

FOREIGN PATENT DOCUMENTS

KR  2010-0113989 A  10/2010

*Primary Examiner* — Ibrahim A Khan
(74) *Attorney, Agent, or Firm* — Harness, Dickey & Pierce, P.L.C.

(57) ABSTRACT

A touch sensing device according to one aspect of the present disclosure includes a touch coordinate calculation unit configured to calculate a touch coordinate corresponding to the touch label on the basis of touch intensities of touch electrodes included in the touch label, a representative value calculation unit configured to calculate a representative value of the touch label by correcting the maximum touch intensity value of the touch label on the basis of a coordinate of a target touch electrode and the touch coordinate when the touch input corresponding to the touch coordinate is detected in the edge region of the target touch electrode among the touch electrodes, and a touch coordinate transmission unit configured to determine the touch input as a normal touch when the representative value is greater than or equal to a first threshold and transmit the touch coordinate to a host system.

14 Claims, 10 Drawing Sheets

(56) References Cited

U.S. PATENT DOCUMENTS

2015/0242053 A1\* 8/2015 Gao .................... G06F 3/04186
 345/178
2018/0059866 A1\* 3/2018 Drake .................. G06F 3/0446

\* cited by examiner

FIG. 5A

|  | X5 | X6 | X7 | X8 | X9 | SUM |
|---|---|---|---|---|---|---|
| X Sum | 8 | 71 | 192 | 85 | 10 | 366 |
| Weighted X Sum | 40 | 426 | 1344 | 680 | 90 | 2580 |

|  | Y5 | Y6 | Y7 | Y8 | Y9 | SUM |
|---|---|---|---|---|---|---|
| Y Sum | 17 | 83 | 180 | 73 | 13 | 366 |
| Weighted Y Sum | 85 | 498 | 1260 | 584 | 117 | 2544 |

FIG. 5B

TOUCH SENSING DEVICE AND TOUCH SENSING METHOD

CROSS-REFERENCE TO RELATED APPLICATIONS

This application claims the benefit of the Korean Patent Applications No. 10-2019-0169791 filed on Dec. 18, 2030 which is hereby incorporated by reference as if fully set forth herein.

FIELD

The present specification relates to a touch sensing device.

BACKGROUND

With development into an information society, various demands are increasing for display devices for displaying images. Recently, various types of display devices such as a liquid crystal display (LCD) device or an organic light-emitting diode (OLED) display device are being utilized.

In recent years, display devices having a touch screen panel capable of detecting a touch input by a user's finger, a stylus pen, or the like have been widely used to break away from conventional input methods using buttons, a keyboard, a mouse, and the like. The display device having such a touch screen panel includes a touch sensing device for accurately detecting the presence or absence of a touch and a touch coordinate (a touch position).

The touch sensing device assigns identification information to touch electrodes whose touch intensities are calculated to be greater than or equal to a predetermined touch threshold on a touch screen panel and sets a touch label with touch electrodes to which the same identification information is assigned, thereby calculating touch coordinates. In this case, in order to prevent dead zones from being occurred, the touch threshold is determined on the basis of the smallest value among touch intensities occurring at all positions on the touch screen panel.

However, when a pitch of a touch electrode is increased, the possibility, in which a touch input is detected in an edge region of the touch electrode rather than in a center portion thereof, is increased, and as illustrated in FIG. 1A, a touch intensity is calculated as a low value in a case in which an edge region E of a touch electrode 100 is touched as compared to a case in which a center region C of the touch electrode 100 is touched so that the touch threshold also has to be set to a low value. Thus, when the edge region E of the touch electrode 100 is touched, there is a problem in that it is inevitably difficult to distinguish between a ghost touch and a normal touch due to the touch threshold set to a low value.

Further, when the edge region of the touch electrode is touched, a touch intensity is calculated to be low compared to a case in which the center region of the touch electrode is touched, and thus, as illustrated in FIG. 1B, when touch drawing 110 is performed in the form of crossing a plurality of touch electrodes 100a to 100n over a plurality of frames, a difference in touch intensity inevitably occurs between a frame F1 in which a center region C of the touch electrode 100a is touched and a frame F2 in which an edge region E of the touch electrode 100a is touched among consecutive frames on which the touch drawing 110 has been performed. Accordingly, a deviation between the touch intensities of the frames increases more than a predetermined threshold, and thus there is a problem in that it is difficult to accurately distinguish whether the variation in touch intensity, which occurs in the corresponding touch drawing, is due to noise.

SUMMARY

The present disclosure is directed to providing a touch sensing device and a touch sensing method capable of correcting a maximum touch intensity value of a touch label including a touch electrode when a touch input is detected in an edge region of the corresponding touch electrode.

The present disclosure is also directed to providing a touch sensing device and a touch sensing method capable of accurately searching for whether noise is generated during touch drawing by correcting a maximum touch intensity value.

According to an aspect of the present disclosure, there is provided a touch sensing device including a touch coordinate calculation unit configured to calculate a touch coordinate corresponding to a touch label on the basis of touch intensities of touch electrodes included in the touch label, a representative value calculation unit configured to calculate a representative value of the touch label by correcting a maximum touch intensity value of the touch label on the basis of a coordinate of a target touch electrode and the touch coordinate when a touch input corresponding to the touch coordinate is detected in an edge region of the target touch electrode among the touch electrodes, and a touch coordinate transmission unit configured to determine the touch input as a normal touch when the representative value is greater than or equal to a first threshold and transmit the touch coordinate to a host system.

According to another aspect of the present disclosure, there is provided a touch sensing method including calculating a touch coordinate corresponding to a first touch label of a first frame on the basis of touch intensities of touch electrodes included in the first touch label, determining whether a touch input corresponding to the touch coordinate is detected in an edge region of a target touch electrode among the touch electrodes, calculating a first representative value of the first touch label by correcting a maximum touch intensity value of the first touch label on the basis of a coordinate of the target touch electrode and the touch coordinate when the touch input is detected in the edge region of the target touch electrode, and determining the touch input as a normal touch when the first representative value is greater than or equal to a first threshold to output the touch coordinate.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 5A is a view illustrating an example in which a touch coordinate calculation unit illustrated in FIG. 4 calculates a touch intensity for each touch electrode;

FIG. 5B is a conceptual view illustrating a method of calculating a touch coordinate on the basis of the example illustrated in FIG. 5A by the touch coordinate calculation unit illustrated in FIG. 4;

DETAILED DESCRIPTION

Figure 1A:
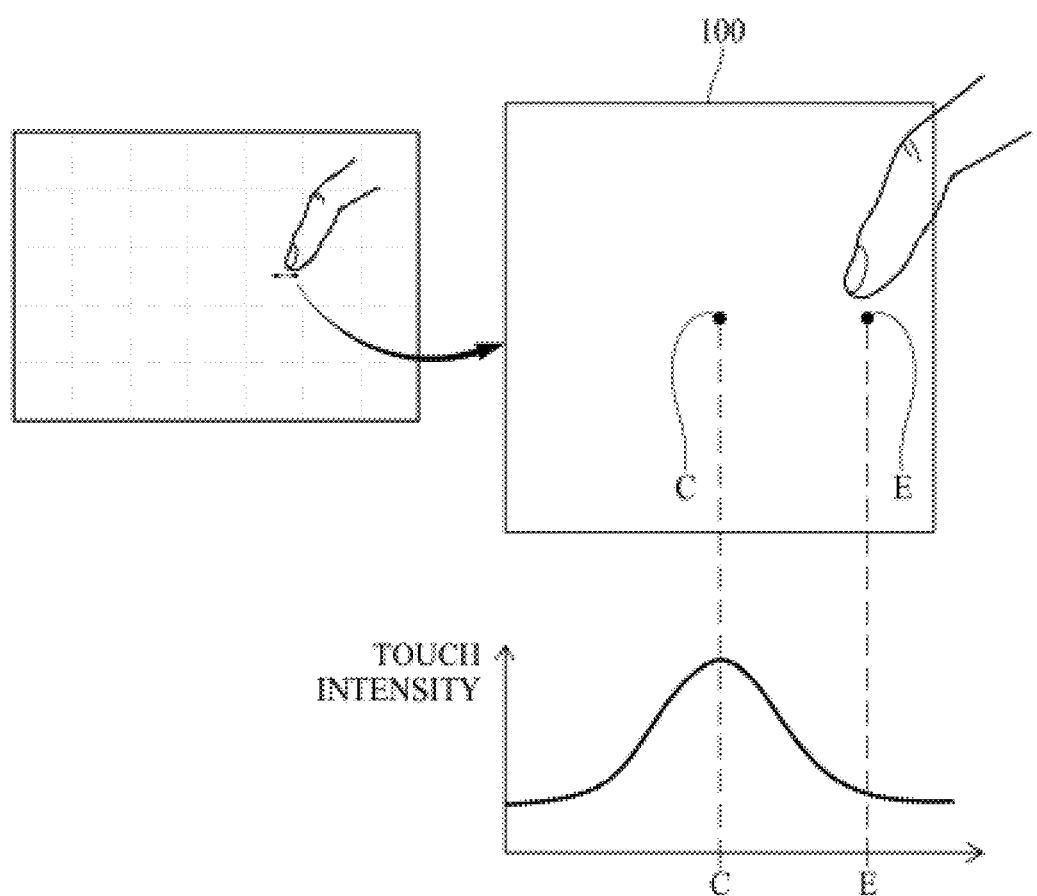
FIG. 1A is a view illustrating a variation in a touch intensity according to a touch input position in a touch electrode.
Figure 1B:
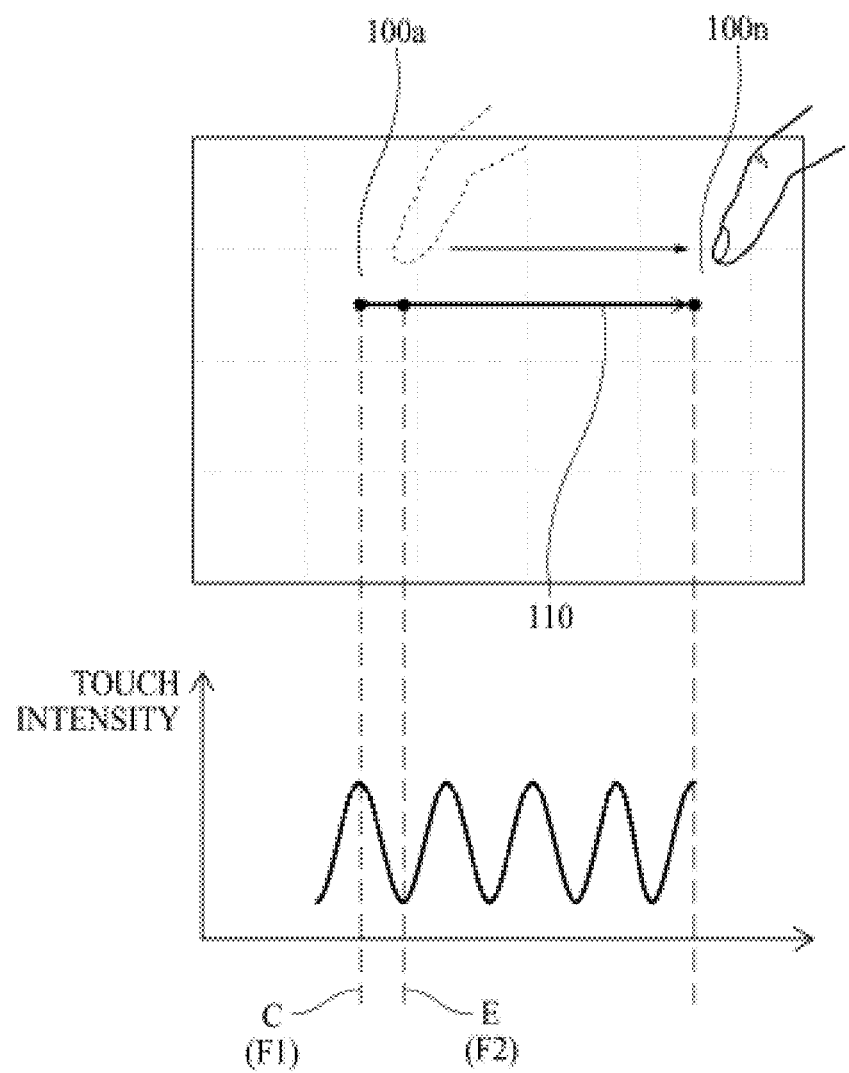
FIG. 1B is a view illustrating variations in a touch intensity between frames during touch drawing.

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

An X axis direction, a Y axis direction, and a Z axis direction should not be construed as only a geometric relationship where a relationship therebetween is vertical, and may denote having a broader directionality within a scope where elements of the present disclosure operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present specification will be described in detail with reference to the accompanying drawings.

Figure 2:
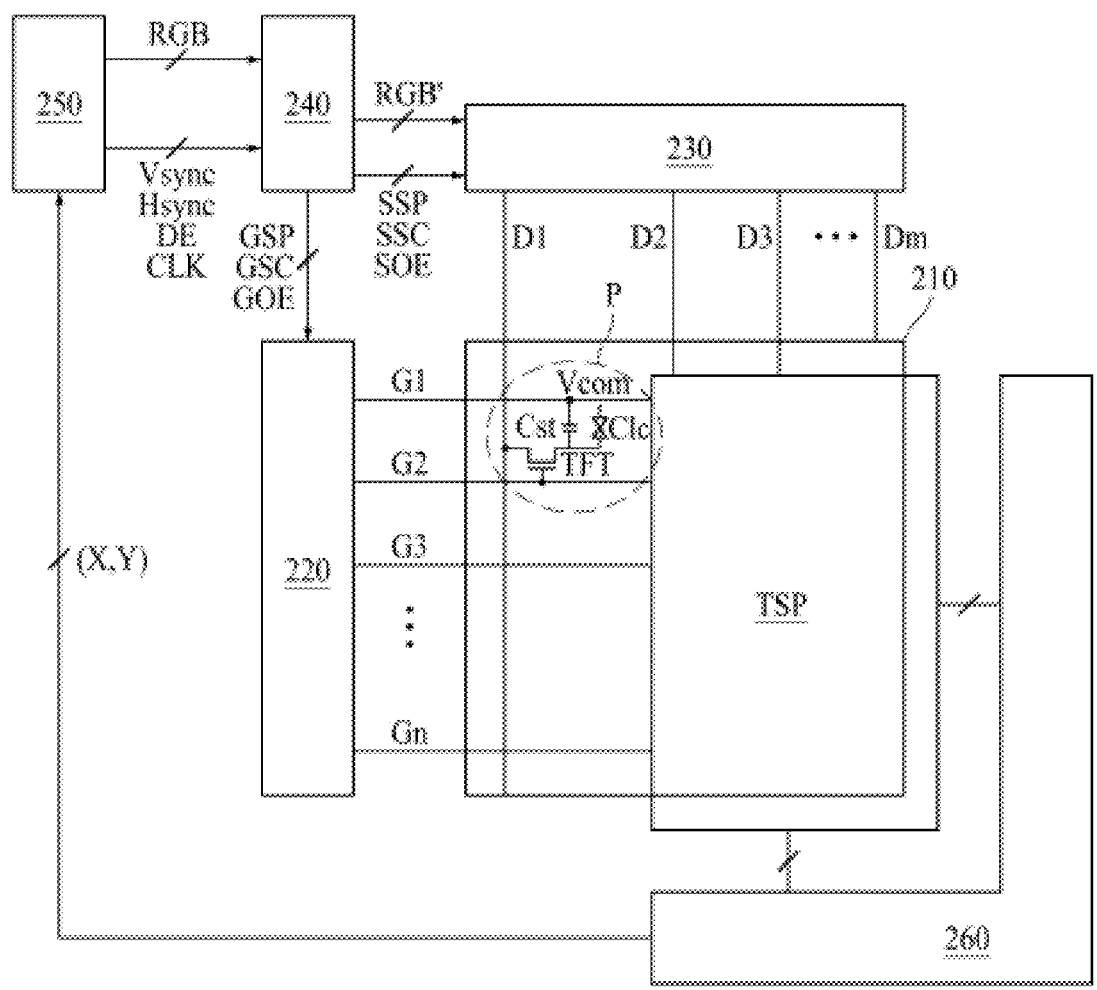
FIG. 2 is a diagram illustrating a display system to which a touch sensing device according to one embodiment of the present disclosure is applied.

FIG. 2 is a diagram illustrating a display system to which a touch sensing device according to one embodiment of the present disclosure is applied.

As illustrated in FIG. 2, a display system 200 includes a display panel 210, a gate driver 220, a data driver 230, a timing controller 240, a host system 250, a touch screen panel TSP, and a touch sensing device 260.

The display panel 210 includes a plurality of gate lines G1 to Gn and a plurality of data lines D1 to Dm, which are arranged to intersect each other and define a plurality of pixel regions, and a pixel P provided in each of the plurality of pixel regions. The plurality of gate lines G1 to Gn may be extended in a transverse direction and the plurality of data lines D1 to Dm may be extended in a longitudinal direction, but the present disclosure is not necessarily limited thereto.

In one embodiment, the display panel 210 may be a liquid crystal display (LCD) panel. When the display panel 210 is an LCD panel, the display panel 210 includes thin-film transistors (TFTs) and liquid crystal cells connected to the TFTs, which are formed in the pixel regions defined by the plurality of gate lines G1 to Gn and the plurality of data lines D1 to Dm.

The TFT transmits a source signal supplied through the data lines D1 to Dm to the liquid crystal cell in response to a scan pulse supplied through the gate lines G1 to Gn.

The liquid crystal cell is composed of a common electrode and a sub-pixel electrode, which is connected to the TFT, facing each other with a liquid crystal therebetween, and thus may be equivalently expressed as a liquid crystal capacitor Clc. The liquid crystal cell includes a storage capacitor Cst connected to the gate line of a previous stage in order to maintain a voltage corresponding to the source signal charged in the liquid crystal capacitor Clc until a voltage corresponding to a next source signal is charged.

Meanwhile, the pixel regions of the display panel 210 may include red (R), green (G), blue (B), and white (W)

subpixels. In one embodiment, each of the subpixels may be repeatedly formed in a row direction or formed in a matrix form of 2×2. In this case, a color filter corresponding to each color is disposed in each of the red (R), green (G), and blue (B) subpixels, but a separate color filter is not disposed in the white (W) subpixel. In one embodiment, the red (R), green (G), blue (B), and white (W) subpixels may be formed to have the same area ratio, but may also be formed to have different area ratios.

Although the display panel 210 has been described as being an LCD panel in the above-described embodiment, in other embodiments, the display panel 210 may also be an organic light-emitting diode (OLED) display panel.

The gate driver 220 includes a shift register configured to sequentially generate a scan pulse, that is, a gate high pulse, in response to a gate control signal GCS from the timing controller 240. In response to the scan pulse, the TFT is turned on.

The gate driver 220 may be disposed on one side of the display panel 210, for example, on a left side of the display panel 210 as illustrated in the drawing, but in some cases, may be disposed on one side and the other side of the display panel 210 which are opposite to each other, for example, both left and right sides thereof. The gate driver 220 may include a plurality of gate driver integrated circuits (ICs) (not shown). The gate driver 220 may be formed in the form of a tape carrier package on which the gate driver ICs are mounted, but the present disclosure is not necessarily limited thereto, and the gate driver ICs may be directly mounted on the display panel 210.

The data driver 230 converts a digital image signal RGB' transmitted from the timing controller 240 into an analog source signal and outputs the analog source signal to the display panel 210. In more detail, the data driver 230 outputs the analog source signal to the data lines D1 to Dm in response to a data control signal DCS transmitted from the timing controller 240.

The data driver 230 may be disposed on one side of the display panel 210, for example, on an upper side of the display panel 210, but in some cases, may be disposed on one side and the other side of the display panel 210 which are opposite to each other, for example, both upper and lower sides thereof. In addition, the data driver 230 may be formed in the form of a tape carrier package on which source driver ICs are mounted, but the present disclosure is not necessarily limited thereto.

In one embodiment, the data driver 230 may include a plurality of source driver ICs (not shown) configured to convert a digital image signal transmitted from the timing controller 240 into an analog source signal and output the analog source signal to the display panel 210.

The timing controller 240 receives various timing signals including a vertical synchronization signal Vsync, a horizontal synchronization signal Hsync, a data enable signal DE, a clock signal CLK, and the like from the host system 250, and generates the data control signal DCS for controlling the data driver 230 and the gate control signal GCS for controlling the gate driver 220. In addition, the timing controller 240 receives an image signal RGB from the host system 250, converts the received image signal RGB into the image signal RGB' in a form that can be processed by the data driver 230, and outputs the converted image signal RGB'.

In one embodiment, the data control signal DCS may include a source start pulse SSP, a source sampling clock SSC, a source output enable signal SOE, and the like, and the gate control signal GCS may include a gate start pulse GSP, a gate shift clock GSC, a gate output enable-signal GOE, and the like.

Here, the source start pulse controls a data sampling start timing of the plurality of source driver ICs which configure the data driver 230. The source sampling clock is a clock signal which controls a sampling timing of data in each of the source driver ICs. The source output enable signal controls an output timing of each of the source driver ICs.

The gate start pulse controls an operation start timing of the plurality of gate driver ICs which configure the gate driver 220. The gate shift clock is a clock signal which is commonly input to one or more gate driver ICs and controls a shift timing of a scan signal (gate pulse). The gate output enable-signal designates timing information of one or more gate driver ICs.

The host system 250 may be implemented as one among a navigation system, a set-top box, a digital video disk (DVD) player, a Blu-ray player, a personal computer (PC), a home theater system, a broadcast receiver, and a phone system. The host system 250 includes a system-on-chip (SoC) with a built-in scaler to convert the digital image signal RGB of an input image into a format suitable for display on the display panel 210. The host system 250 transmits the digital image signal RGB and the timing signals to the timing controller 240. In addition, the host system 250 analyzes touch coordinates X and Y input from the touch sensing device 260, and outputs the touch coordinate on the display panel 210 in a form of lines or executes an application program associated with coordinates generated by a user's touch.

Figure 3A:
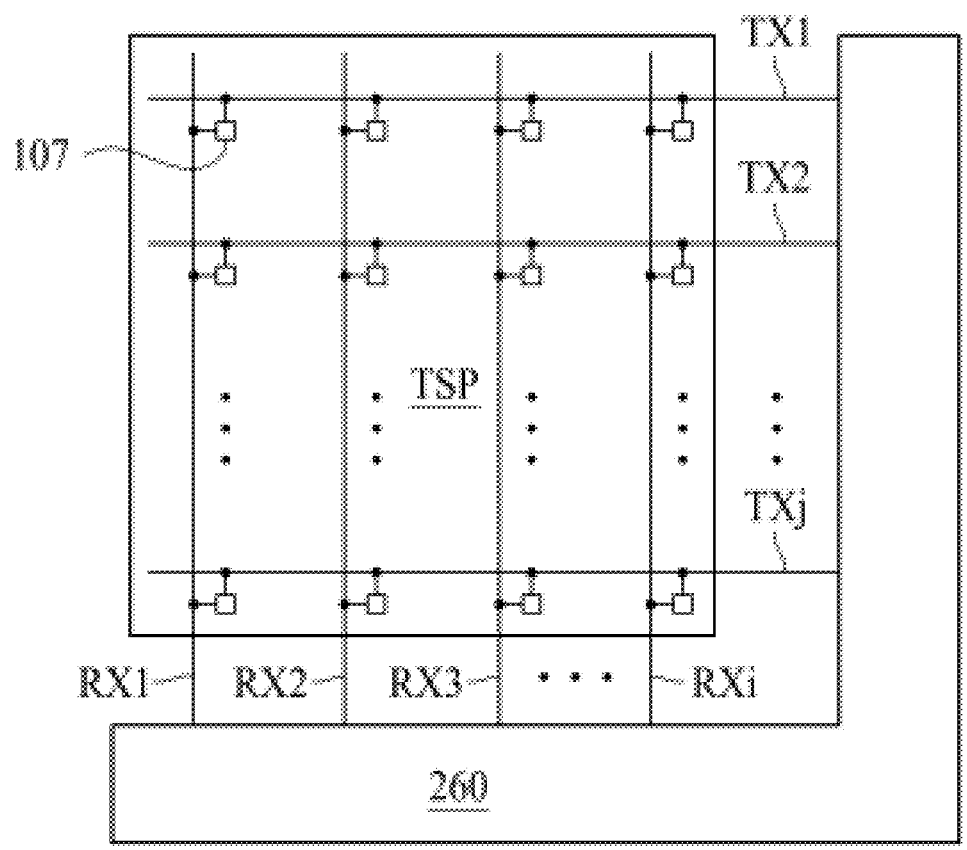
FIGS. 3A and 3B are schematic diagrams illustrating a configuration of a touch screen panel illustrated in FIG. 2.

The touch screen panel TSP is where the user's touch is input, and in one embodiment, as illustrated in FIG. 3A, the touch screen panel TSP may include touch driving lines TX1 to TXj (where, j is a natural number greater than or equal to 2) through which a touch driving signal is transmitted, a plurality of touch electrodes 107, and touch sensing lines RX1 to RXi (where, i is a natural number greater than or equal to 2) through which voltages (or charges) of the touch electrodes 107 are transmitted. In this case, each of the touch electrodes 107 includes a mutual capacitor. The touch sensing lines RX1 to RXi may refer to sensing lines of the touch screen panel TSP. In one embodiment, the touch screen panel TSP may be implemented in a form embedded in the display panel 210. For example, the touch screen panel TSP may be disposed on the display panel 210 in an on-cell manner or may be disposed in the display panel 210 an in-cell manner.

Figure 3B:
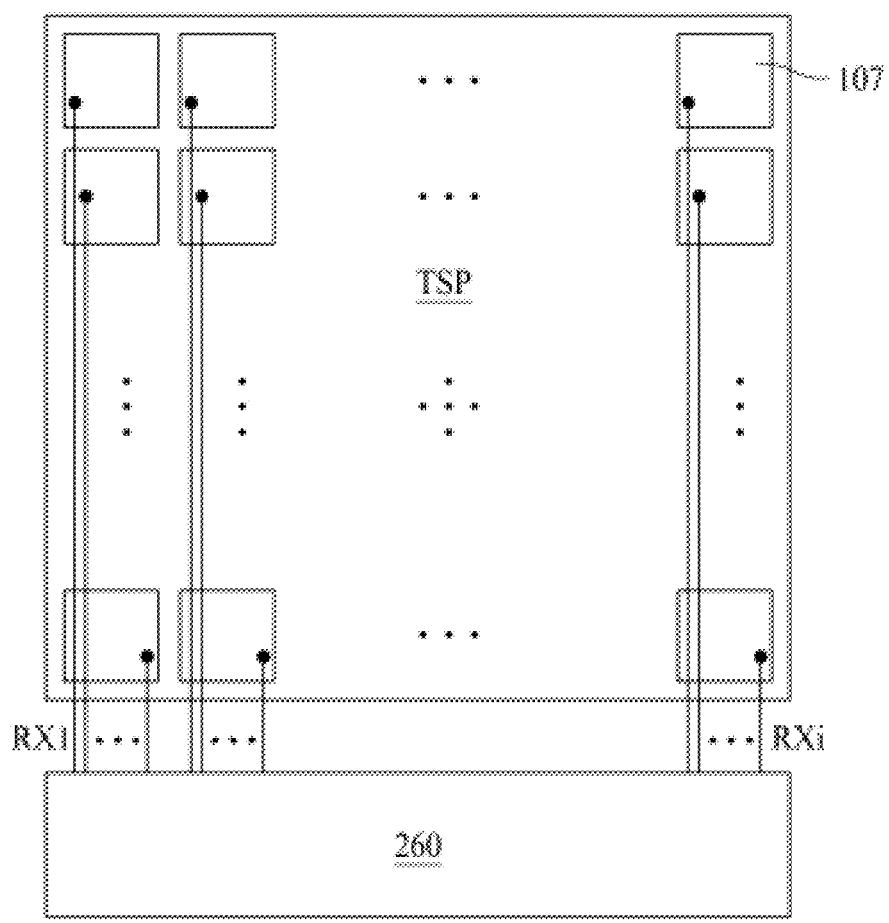

In FIG. 3A, the touch screen panel TSP is illustrated as being a mutual-capacitance-type touch screen panel including the touch driving lines TX1 to TXj and the touch sensing lines RX1 to RXi. However, the present disclosure is not limited thereto, and a self-capacitance-type touch screen panel may be applied as illustrated in FIG. 3B. In the self-capacitance-type touch screen panel, the supply of a touch driving signal and the reception of a change in capacitance caused by a user's touch or a touch by a stylus pen are implemented through one of the touch sensing lines RX1 to RXi.

Referring to FIG. 2 again, the touch sensing device 260 senses a touch generated on the touch screen panel TSP. In one embodiment, the touch sensing device 260 drives the touch electrodes 107 by supplying the touch driving signal to the touch electrodes 107 through the touch driving lines TX1 to TXj, and senses a change in capacitance, which occurs when the touch electrodes 107 are touched, through the touch sensing lines RX1 to RXi.

The touch sensing device 260 calculates touch raw data TRD on the basis of the obtained capacitance change, and calculates a touch coordinate on the basis of the calculated touch raw data.

In more detail, the touch sensing device 260 calculates a touch intensity of each of the touch electrodes 107 on the basis of the touch raw data, sets a touch label with the touch electrodes whose calculated touch intensities are greater than or equal to a threshold, and then calculates a touch coordinate for each touch label.

In particular, when a touch input, which is generated on a touch electrode having a maximum touch intensity within the touch label, is detected in an edge region of the touch electrode, the touch sensing device 260 according to the present disclosure corrects the touch intensity of the corresponding touch electrode, that is, a maximum touch intensity value of the touch label including the corresponding touch electrode, to easily distinguish between a ghost touch and a normal touch. As described above, when the maximum touch intensity value of the touch label is set by the touch input detected in the edge region of the touch electrode, the touch sensing device 260 according to the present disclosure may easily distinguish between the ghost touch and the normal touch even when the threshold for determining the ghost touch is set as a great value by increasing the maximum touch intensity value through the correction.

The touch sensing device 260 transmits touch coordinates X and Y for the touch input determined as the normal touch to the host system 250.

Hereinafter, a configuration of the touch sensing device according to the present disclosure will be described in more detail with reference to FIG. 4.

Figure 4:
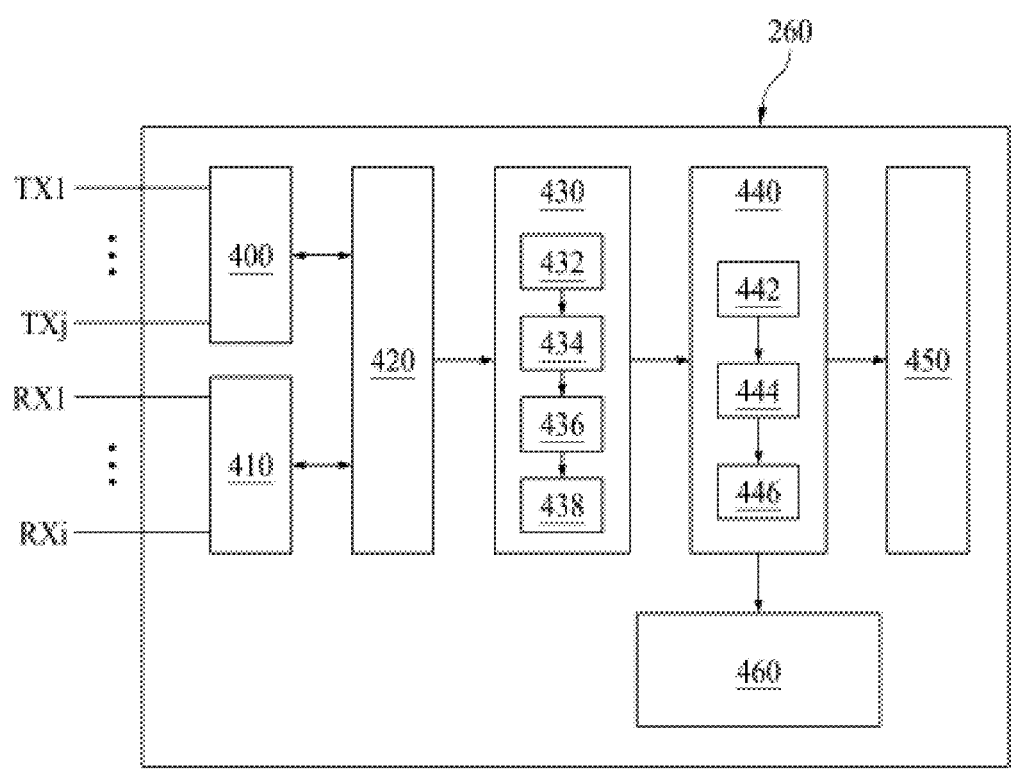
FIG. 4 is a schematic block diagram illustrating a configuration of the touch sensing device illustrated in FIGS. 2, 3A, and 3B.

FIG. 4 is a schematic block diagram illustrating the configuration of the touch sensing device according to one embodiment of the present disclosure. As illustrated in FIG. 4, the touch sensing device 260 according to one embodiment of the present disclosure includes a touch driving unit 400, a touch sensing unit 410, a touch controller 420, a touch coordinate calculation unit 430, a representative value calculation unit 440, and a touch coordinate transmission unit 450. In addition, the touch sensing device 260 according to the present disclosure may further include a noise search unit 460 configured to perform a function of searching for noise during touch drawing.

According to the embodiment, the touch driving unit 400, the touch sensing unit 410, the touch controller 420, the touch coordinate calculation unit 430, the representative value calculation unit 440, the touch coordinate transmission unit 450, and the noise search unit 460 may be integrated into one read-out IC (ROIC).

The touch driving unit 400 selects a touch driving channel through which a touch driving pulse is output under the control of the touch controller 420, and supplies the touch driving pulse to the touch driving lines TX1 to TXj connected to the selected touch driving channel.

The touch sensing unit 410 selects a touch sensing channel through which the voltages of the touch electrodes are received under the control of the touch controller 420, and receives the voltages of the touch electrodes through the touch sensing lines RX1 to RXj connected to the selected touch sensing channel. The touch sensing unit 410 samples the voltages of the touch electrodes received through the touch sensing lines RX1 to RXi and accumulates the sampled voltages in an integrator (not shown). The touch sensing unit 410 converts the voltages accumulated in the integrator into touch raw data TRD, which is digital data, by inputting the accumulated voltages to an analog-to-digital converter (ADC) (not shown) and then outputs the touch raw data TRD.

The touch controller 420 generates a touch driving setup signal for setting the touch driving channel through which the touch driving pulse is to be output from the touch driving unit 400, and generates a touch sensing setup signal for setting the touch sensing channel through which the voltages of the touch electrodes are to be received by the touch sensing unit 410. In addition, the touch controller 420 generates timing control signals for controlling an operation timing of each of the touch driving unit 400 and the touch sensing unit 410.

The touch coordinate calculation unit 430 calculates the touch coordinate on the basis of the touch raw data TRD input from the touch sensing unit 410. To this end, as illustrated in FIG. 4, the touch coordinate calculation unit 430 includes a touch raw data receiver 432, a touch intensity calculator 434, a touch labeling unit 436, and a touch coordinate calculation unit 438.

The touch raw data receiver 432 receives the touch raw data TRD from the touch sensing unit 410.

The touch intensity calculator 434 compares the touch raw data received by the touch raw data receiver 432 with reference data, calculates a difference between the touch raw data and the reference data, and calculates the calculated difference as the touch intensity of each of the touch electrodes. In one embodiment, the touch intensity calculator 434 may set an average value of the touch raw data obtained from n frames as the reference data. Here, the n frames may be set with initial n frames after the display system 200 is turned on.

FIG. 5A illustrates an example of the touch intensity for each of the touch electrodes calculated by the touch intensity calculator 434.

Referring to FIG. 4 again, the touch labeling unit 436 assigns the same identification (ID) information to touch electrodes having touch intensities, each of which is calculated for each touch electrode within one frame and is greater than or equal to a predetermined label threshold, thereby setting the touch electrodes to which the same ID information is assigned as one touch label. As an example, when the label threshold is set as 7 in the example illustrated in FIG. 5A, 13 touch electrodes each having a touch intensity of 7 or more may be set as one touch label.

In FIG. 5A, it is illustrated that one touch label is included in one frame, but a plurality of touch labels may be included in one frame when a plurality of touch inputs are generated in one frame.

The touch coordinate calculation unit 438 calculates a touch coordinate for the corresponding touch label on the basis of the touch intensity of each of the touch electrodes included in one touch label. In one embodiment, the touch coordinate calculation unit 438 may calculate a touch coordinate for each touch label using Equations 1 and 2 below, $$X = \frac{\sum_{n=1}^{N} X_n W_n}{\sum_{n=1}^{N} W_n}$$ [Equation 1]

$$Y = \frac{\sum_{n=1}^{N} Y_n W_n}{\sum_{n=1}^{N} W_n}$$ [Equation 2]

where X denotes an X-coordinate value of the touch coordinate for a corresponding touch label, Y denotes a Y-coordinate value of a touch coordinate for the touch label, $X_n$ denotes an X-coordinate value of an nth touch electrode included in the corresponding touch label, $Y_n$ denotes a Y-coordinate value of the nth touch electrode included in the corresponding touch label, and $W_n$ denotes a touch intensity of the nth touch electrode included in the corresponding touch label.

When the touch coordinate calculation unit 438 calculates the touch coordinate of the corresponding touch label on the basis of the touch intensities illustrated in FIG. 5A, a result of 2580 is obtained by summing all results obtained by multiplying an X-coordinate value of each of the touch electrodes included in the corresponding touch label by a touch intensity of the corresponding touch electrode, and a result of 366 is obtained by summing all of the touch intensity of each of the touch electrodes included in the corresponding touch label, and thus the touch coordinate calculation unit 438 obtains 7.05 as the X-coordinate value of the touch coordinate for the corresponding touch label by putting the obtained results into Equation 1 described above.

Further, a result of 2544 is obtained by summing all results obtained by multiplying a Y-coordinate value of each of the touch electrodes included in the corresponding touch label by the touch intensity of the corresponding touch electrode, and a result of 366 is obtained by summing all of the touch intensity of each of the touch electrodes included in the corresponding touch label, and thus the touch coordinate calculation unit 438 obtains 6.95 as the Y-coordinate value of the touch coordinate for the corresponding touch label by putting the obtained results into Equation 2 described above.

Referring to FIG. 4 again, the representative value calculation unit 440 calculates a representative value of the corresponding touch label on the basis of the maximum touch intensity value of the touch label set by the touch coordinate calculation unit 430. In one embodiment, when a touch input corresponding to the touch coordinate calculated by the touch coordinate calculation unit 430 is detected at a center of a target touch electrode among the touch electrodes included in the corresponding touch label, the representative value calculation unit 440 calculates the maximum touch intensity value of the corresponding touch label as the representative value of the corresponding touch label.

However, when the touch input corresponding to the touch coordinate calculated by the touch coordinate calculation unit 430 is detected in an edge region of the target touch electrode, the representative value calculation unit 440 corrects the maximum touch intensity value of the corresponding touch label and calculates the corrected maximum touch intensity value as the representative value of the corresponding touch label.

To this end, as illustrated in FIG. 4, the representative value calculation unit 440 according to the present disclosure includes a target touch electrode determiner 442, a determination unit 444, and a maximum value corrector 446.

The target touch electrode determiner 442 determines one of the touch electrodes included in the touch label as the target touch electrode for each touch label. In one embodiment, the target touch electrode determiner 442 may determine a touch electrode having a maximum touch intensity among the touch electrodes included in each touch label as the target touch electrode.

The determination unit 444 determines whether the touch input corresponding to the calculated touch coordinate is detected in a center region or an edge region of the target touch electrode among the touch electrodes included in the corresponding touch label.

In one embodiment, the determination unit 444 determines that the touch input is detected in the edge region of the target touch electrode when a coordinate of the target touch electrode does not match the touch coordinate. In addition, the determination unit 444 determines that the touch input is detected in the center region of the target touch electrode when the coordinate of the target touch electrode matches the touch coordinate.

In more detail, when an X-coordinate value of the touch coordinate is different from an X-coordinate value of the target touch electrode or a Y-coordinate value of the touch coordinate is different from a Y-coordinate value of the target touch electrode, the determination unit 444 determines that the touch input is detected in the edge region of the target touch electrode.

It can be seen that a coordinate value of the touch electrode, which has a maximum touch intensity in the touch label illustrated in FIG. 5A described above, is (7, 7), and a coordinate value of the touch coordinate calculated for the corresponding touch label is (7.05, 6.95), and thus, since the coordinate of the target touch electrode is not equal to the touch coordinate, the determination unit 444 determines that the touch input is detected in the edge region of the target touch electrode.

When it is determined that the touch input is detected in the edge region of the target touch electrode, the determination unit 444 transmits the determination result to the maximum value corrector 446, and when it is determined that the touch input is detected in the center region of the target touch electrode, the determination unit 444 calculates the maximum touch intensity value of the corresponding touch label as the representative value of the corresponding touch label.

When the determination result saying that the touch input is detected in the edge region of the target touch electrode is received from the determination unit 444, the maximum value corrector 446 calculates the representative value of the corresponding touch label by correcting the maximum touch intensity value of the touch label on the basis of the coordinate of the target touch electrode and the touch coordinate.

In one embodiment, the maximum value corrector 446 may calculate a touch input deviation ratio indicating a ratio at which the touch input deviates from the center of the target touch electrode on the basis of a separation distance between the coordinate of the target touch electrode and the touch coordinate and correct the maximum touch intensity value by summing the maximum touch intensity value and a value obtained by multiplying the calculated touch input deviation ratio by the maximum touch intensity value.

In more detail, the maximum value corrector 446 may correct the maximum touch intensity value using Equation 3 below, $$T_R = T_{MAX} + T_{MAX} \times DR \quad \text{[Equation 3]}$$

where $T_R$ denotes the representative value obtained by correcting the maximum touch intensity value, $T_{MAX}$ denotes the maximum touch intensity value, and DR denotes the touch input deviation ratio. The touch input deviation ratio may be calculated by Equation 4 below, $$DR = \frac{D_X + D_Y}{2D_P} \quad \text{[Equation 4]}$$

where DR denotes the touch input deviation ratio, $D_X$ denotes a separation distance between the X-coordinate value of the target touch electrode and the X-coordinate value of the touch coordinate, $D_Y$ denotes a separation distance between the Y-coordinate value of the target touch electrode and the Y-coordinate value of the touch coordinate, and $D_P$ denotes a pitch value of the target touch electrode. In this case, the pitch value of the target touch electrode may be determined differently depending on the size or resolution of the display panel 210.

Figure 6:
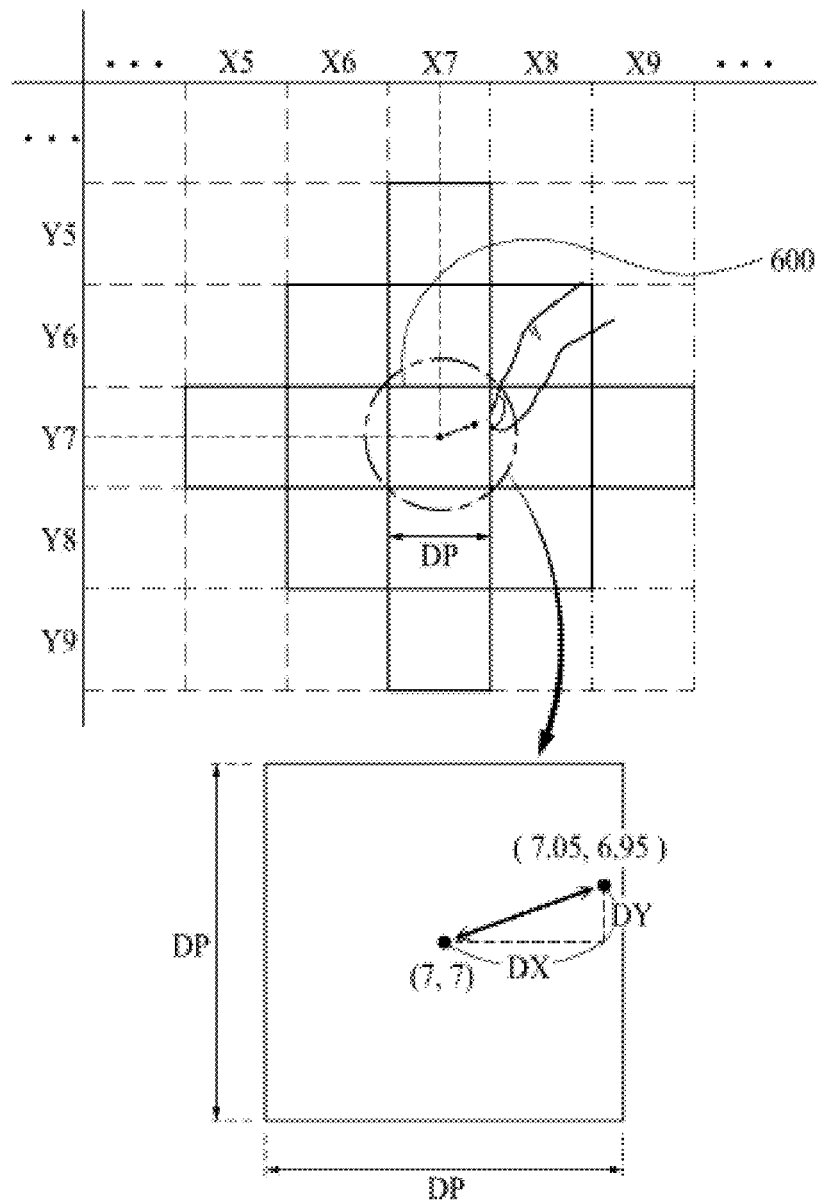
FIG. 6 is a schematic view illustrating a method of calculating a touch input deviation ratio by a representative value calculation unit illustrated in FIG. 4.

Referring to the example illustrated in FIG. 5A, as illustrated in FIG. 6, the maximum value corrector 446 calculates a difference value between 7, which is the X-coordinate value of the target touch electrode, and 7.05, which is the X-coordinate value of the touch coordinate as $D_X$, calculates a difference value between 7, which is the Y-coordinate value of the target touch electrode, and 6.95, which is the Y-coordinate value of the touch coordinate as $D_Y$, and calculates the touch input deviation ratio DR for the corresponding touch input by dividing the summation of the calculated $D_X$ and $D_Y$ by $2D_P$ which is based on a pitch value DP of a target touch electrode 600.

The touch coordinate calculation unit 430 and the representative value calculation unit 440, which are described above, may be implemented as a microcontroller unit (MCU).

Referring to FIG. 4 again, the touch coordinate transmission unit 450 determines whether the corresponding touch input is the ghost touch or the normal touch by comparing the representative value calculated by the representative value calculation unit 440 with a predetermined first threshold. In more detail, the touch coordinate transmission unit 450 determines that the touch input is the normal touch when the representative value calculated by the representative value calculation unit 440 is greater than or equal to the first threshold and determines that the touch input is the ghost touch when the representative value is less than the first threshold.

When it is determined that the touch input is the normal touch, the touch coordinate transmission unit 450 transmits touch coordinates X and Y for the corresponding touch input to the host system 250 according to a predetermined touch coordinate transmission frequency. In this case, the touch coordinate transmission unit 450 may transmit the representative value calculated by the representative value calculation unit 440 to the host system 250 together with the touch coordinates X and Y.

As described above, in the case of the present disclosure, since it is possible to increase the maximum touch intensity value of the touch label including the corresponding touch electrode, even when a touch input is occurred in the edge region of the touch electrode, the touch input may be easily distinguished from the ghost touch even when the first threshold for determining the ghost touch is set to a great value.

Meanwhile, as illustrated in FIG. 4, the touch sensing device 260 according to the present disclosure may further include the noise search unit 460 in order to search for whether noise is generated during touch drawing.

When touch drawing is performed by a touch that is continuously input over a plurality of frames, the noise search unit 460 searches for whether noise is generated during the touch drawing by comparing representative values of touch labels included in each frame. In one embodiment, the noise search unit 460 may search for whether noise is generated in the corresponding touch drawing by comparing a deviation between the representative values of the touch labels included in each frame with a predetermined second threshold.

Figure 7:
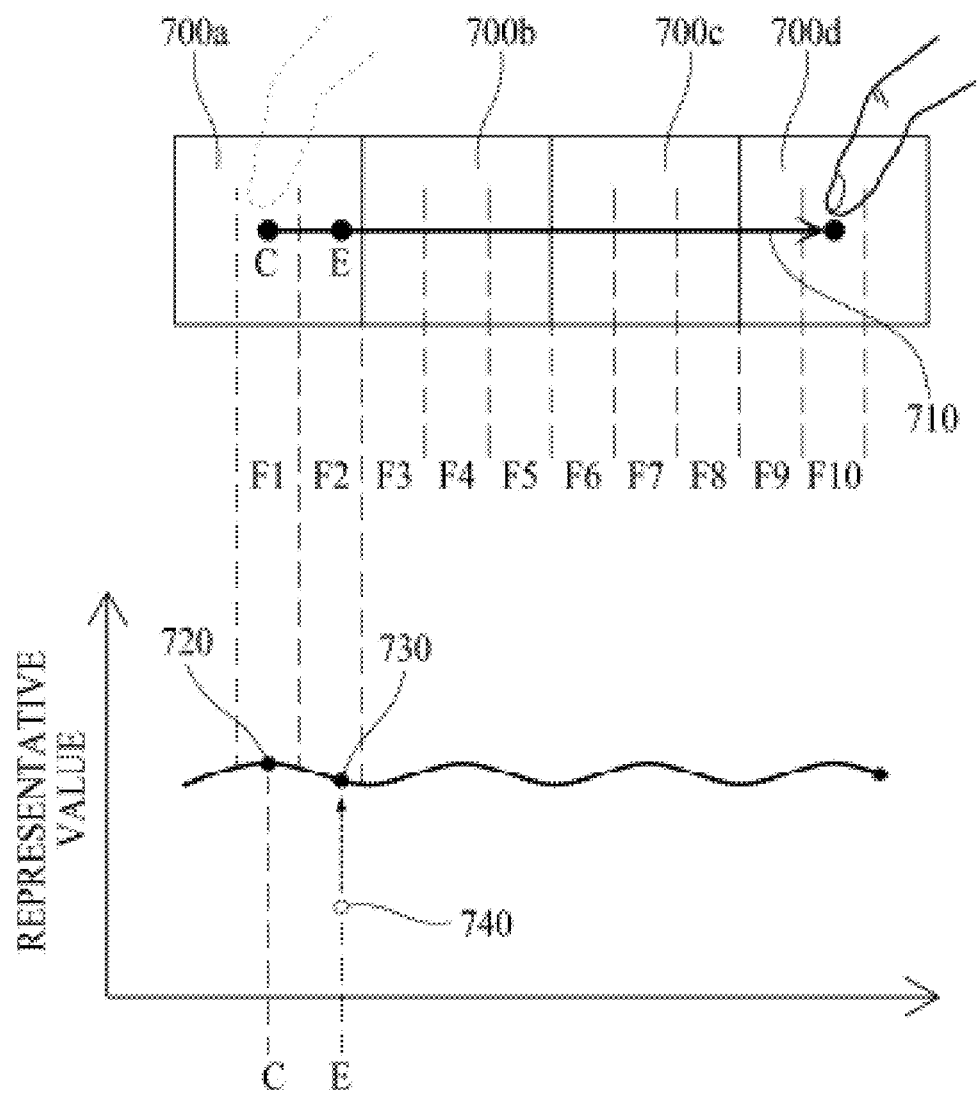
FIG. 7 is a view illustrating a variation in a representative value between frames, which is calculated by correcting a maximum touch intensity value according to the present disclosure, during touch drawing.

In more detail, as illustrated in FIG. 7, when touch drawing 710 is performed in the form of crossing a plurality of touch electrodes 700a to 700d over a plurality of frames F1 to F10, the noise search unit 460 calculates a deviation between a first representative value 720 of the first touch label included in a first frame F1 and a second representative value 730 of a second touch label included in a second frame F2 following the first frame F1 and determines whether the calculated deviation exceeds the second threshold.

Here, since a center region C of the touch electrode 700a is touched in the first frame F1 of the consecutive frames F1 to F10 in which the touch drawing 710 is performed, a maximum touch intensity value of the first touch label included in the first frame F1 is determined as the first representative value 720 of the first frame F1 by the representative value calculation unit 440.

However, since an edge region E of the touch electrode 700a is touched in the second frame F2, a maximum touch intensity value 740 of the second touch label included in the second frame F2 has to be corrected on the basis of a touch input deviation ratio calculated by the representative value calculation unit 440.

If the correction for the maximum touch intensity value 740 of the second frame F2 is not performed, since the maximum touch intensity value of the second frame F2 is set as a representative value of the second frame F2, the deviation between the first representative value 720 of the first frame F1 and the representative value of the second frame F2 increases, and thus the noise search unit 460 determines that noise has been generated in the corresponding touch drawing 710 even when the noise is not generated in the touch drawing.

However, in the case of the present disclosure, since the maximum touch intensity value 740 of the second frame F2 is corrected on the basis of the touch input deviation ratio by the representative value calculation unit 440 and a value obtained by correcting the maximum touch intensity value 740 is determined as a second representative value 730 is calculated, the deviation between the first representative value 720 of the first frame F1 and the second representative value 730 of the second frame F2 is reduced so that the noise search unit 460 may determine that noise has not been generated in the corresponding touch drawing 710.

Figure 8:
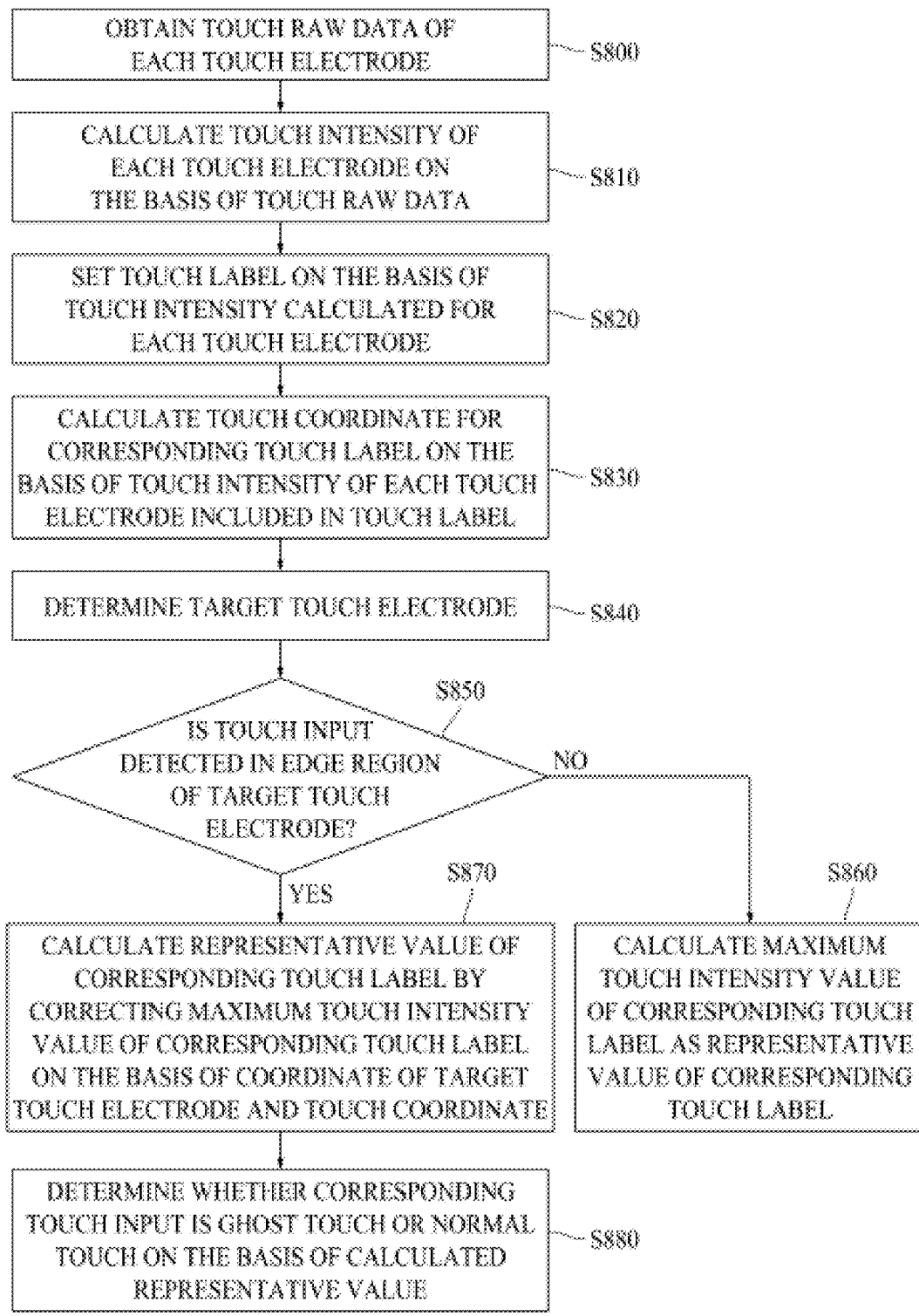
FIG. 8 is a flowchart illustrating a touch sensing method according to one embodiment of the present disclosure.

Hereinafter, a touch sensing method according to the present disclosure will be described with reference to FIG. 8. FIG. 8 is a flowchart illustrating a touch sensing method according to one embodiment of the present disclosure. The touch sensing method illustrated in FIG. 8 may be performed by the touch sensing device illustrated in FIG. 4.

First, a touch sensing device obtains touch raw data on the basis of voltages of touch electrodes received through touch sensing lines (S800). In one embodiment, the touch sensing device may obtain the touch raw data by sampling the voltages of the touch electrodes obtained through the touch sensing lines, accumulating the sampled voltages in an integrator, and converting the voltages accumulated in the integrator into digital data through an ADC.

Thereafter, the touch sensing device calculates a touch intensity of each of the touch electrodes on the basis of the touch raw data obtained in the operation S800 (S810). In one embodiment, the touch sensing device may compare the touch raw data and reference data to calculate a difference between the touch raw data and the reference data and calculate the calculated difference as the touch intensity of each of the touch electrodes. In this case, the reference data may be set as an average value of the touch raw data obtained from n frames after the power-on of a display system.

Thereafter, the touch sensing device sets a touch label on the basis of the touch intensity calculated for each touch electrode (S820). In more detail, the touch sensing device assigns the same ID to touch electrodes having touch intensities, each of which is calculated for each touch electrode within one frame and is greater than or equal to a predetermined label threshold, thereby setting the touch electrodes to which the same ID information is assigned as one touch label. In this case, when a plurality of touch inputs are generated within one frame, a plurality of touch labels may be included in one frame.

Thereafter, the touch sensing device calculates a touch coordinate for the corresponding touch label on the basis of the touch intensity of each of the touch electrodes included in one touch label (S830). In more detail, the touch sensing device may calculate an X-coordinate value of the touch coordinate for the corresponding touch label using Equation 1 described above and may calculate a Y-coordinate value of the touch coordinate for the corresponding touch label using Equation 2 described above. A detailed method of calculating the touch coordinate by the touch sensing device has been described in Equations 1 and 2 above, and thus a detailed description thereof will be omitted.

Thereafter, the touch sensing device determines a target touch electrode among the touch electrodes included in the corresponding touch label (S840) and determines whether the touch input corresponding to the touch coordinate calculated in the operation S820 is detected in an edge region of the target touch electrode (S850). In one embodiment, the touch sensing device may determine a touch electrode having a maximum touch intensity among the touch electrodes included in each touch label as the target touch electrode.

According to the embodiment, the touch sensing device may determine whether the touch input corresponding to the touch coordinate is detected in the edge region of the target touch electrode by determining whether a coordinate of the target touch electrode is identical to the touch coordinate. In more detail, the touch sensing device determines that the touch input is detected in the edge region of the target touch electrode when the coordinate of the target touch electrode does not match the touch coordinate and determines that the touch input is detected in a center region of the target touch electrode when the coordinate of the target touch electrode matches the touch coordinate.

When it is determined that the touch input is detected in the center region of the target touch electrode according to a result of the determination of the operation S850, the touch sensing device sets a maximum touch intensity value of the corresponding touch label as a representative value of the corresponding touch label (S860).

However, when it is determined that the touch input is detected in the edge region of the target touch electrode according to the result of the determination of the operation S850, the touch sensing device calculates the representative value of the corresponding touch label by correcting the maximum touch intensity value of the corresponding touch label on the basis of the coordinate of the target touch electrode and the touch coordinate (S870).

In one embodiment, the touch sensing device may calculate a touch input deviation ratio indicating a ratio at which the touch input deviates from the center of the target touch electrode on the basis of a separation distance between the coordinate of the target touch electrode and the touch coordinate and correct the maximum touch intensity value by summing the maximum touch intensity value and a value obtained by multiplying the calculated touch input deviation ratio by the maximum touch intensity value.

A method of calculating the representative value of the corresponding touch label by correcting the maximum touch intensity value by the touch sensing device has been described in the part described with reference to Equations 3 and 4 above, and thus a detailed description thereof will be omitted.

Thereafter, the touch sensing device determines whether the corresponding touch input is a ghost touch or a normal touch on the basis of the representative value calculated in the operation S860 or S870 (S880). In more detail, the touch sensing device determines that the corresponding touch input is the normal touch when the representative value is greater than or equal to a first threshold and determines that the corresponding touch input is the ghost touch when the representative value is less than the first threshold.

Although not illustrated in FIG. 8, the touch sensing device may transmit the touch coordinate of the touch input determined to be the normal touch to a host system. In this case, the touch sensing device may transmit the representative value to the host system together with the touch coordinate.

As described above, in the case of the present disclosure, since it is possible to increase the maximum touch intensity value of the touch label including the corresponding touch electrode, even when a touch input is generated in the edge region of the touch electrode, the touch input may be easily distinguished from the ghost touch even when the first threshold is set to a great value.

Meanwhile, although not illustrated in FIG. 8, when touch drawing is performed by a touch that is continuously inputted over a plurality of frames, the touch sensing device according to the present disclosure may search for whether noise is generated during the touch drawing by comparing representative values of touch labels included in each frame.

In more detail, the touch sensing device may determine that noise has been generated in the corresponding touch drawing when a deviation between the representative values of consecutive frames exceeds a second threshold and determine that the noise has not been generated in the corresponding touch drawing when the deviation between the representative values of consecutive frames does not exceed the second threshold.

It should be understood by those skilled in the art that the present disclosure can be embodied in other specific forms without changing the technical concept and essential features of the present disclosure.

All disclosed methods and procedures described herein may be implemented, at least in part, using one or more computer programs or components. These components may be provided as a series of computer instructions through any conventional computer-readable medium or machine-readable medium including volatile and nonvolatile memories such as random-access memories (RAMs), read only-memories (ROMs), flash memories, magnetic or optical disks, optical memories, or other storage media. The instructions may be provided as software or firmware, and may, in whole or in part, be implemented in a hardware configuration such as application-specific integrated circuits (ASICs), field-programmable gate arrays (FPGAs), digital signal processors (DSPs), or any other similar device. The instructions may be configured to be executed by one or more processors or other hardware configurations, and the processors or other hardware configurations are allowed to perform all or part of the methods and procedures disclosed herein when executing the series of computer instructions.

According to the present disclosure, when a touch input is detected in an edge region of a target touch electrode that has a maximum touch intensity within a touch label, a maximum touch intensity value can be corrected on the basis of a separation distance between a coordinate of the target touch electrode and a touch coordinate, and thus, there is an effect that a normal touch can be easily distinguished from a ghost touch even when a threshold for distinguishing the ghost touch is set to a great value.

Further, according to the present disclosure, a maximum touch intensity value of a frame, in which a touch input is detected in an edge region of a touch electrode during touch drawing, can be corrected on the basis of a separation distance between a coordinate of the corresponding touch electrode and a touch coordinate so that a deviation between touch intensities of each frame can be reduced, and thus there is an effect that the generation of noise can be accurately searched for during the touch drawing.

Therefore, the above-described embodiments should be understood to be exemplary and not limiting in every aspect. The scope of the present disclosure will be defined by the following claims rather than the above-detailed description, and all changes and modifications derived from the meaning and the scope of the claims and equivalents thereof should be understood as being included in the scope of the present disclosure.

What is claimed is:

1. A touch sensing device comprising:
a touch coordinate calculation circuit configured to calculate a touch coordinate corresponding to a touch label on the basis of touch intensities of touch electrodes included in the touch label;
a representative value calculation circuit configured to calculate a representative value of the touch label by correcting a maximum touch intensity value of the touch label on the basis of a coordinate of a target touch electrode and the touch coordinate when a touch input corresponding to the touch coordinate is detected in an edge region of the target touch electrode among the touch electrodes; and
a touch coordinate transmission circuit configured to determine the touch input as a normal touch when the representative value is greater than or equal to a first threshold and transmit the touch coordinate to a host system;
wherein the representative value calculation unit is configured to calculate a touch input deviation ratio indicating a ratio at which the touch input deviates from a center of the target touch electrode on the basis of a separation distance between the coordinate of the target touch electrode and the touch coordinate, and correct the maximum touch intensity value by summing the maximum touch intensity value and a value obtained by multiplying the calculated touch input deviation ratio by the maximum touch intensity value.

2. The touch sensing device of claim 1, wherein the representative value calculation circuit unit determines a touch electrode having a maximum touch intensity among the touch electrodes as the target touch electrode.

3. The touch sensing device of claim 1, wherein, when an X-coordinate value of the touch coordinate is different from an X-coordinate value of the target touch electrode or a Y-coordinate value of the touch coordinate is different from a Y-coordinate value of the target touch electrode, the representative value calculation circuit unit determines that the touch input is generated in the edge region of the target touch electrode.

4. The touch sensing device of claim 1, wherein the representative value calculation circuit unit calculates the touch input deviation ratio using an equation of $$DR = \frac{D_X + D_Y}{2D_P},$$

wherein DR denotes the touch input deviation ratio,
$D_X$ denotes a separation distance between an X-coordinate value of the target touch electrode and an X-coordinate value of the touch coordinate,
$D_Y$ denotes a separation distance between a Y-coordinate value of the target touch electrode and a Y-coordinate value of the touch coordinate, and
$D_P$ denotes a pitch value of the target touch electrode.

5. The touch sensing device of claim 1, wherein the touch coordinate calculation circuit calculates an X-coordinate value of the touch coordinate using an equation of $$X = \frac{\sum_{n=1}^{N} X_n W_n}{\sum_{n=1}^{N} W_n}$$

and calculates a Y-coordinate value of the touch coordinate using an equation of $$Y = \frac{\sum_{n=1}^{N} Y_n W_n}{\sum_{n=1}^{N} W_n},$$

wherein X denotes the X-coordinate value of the touch coordinate,
$X_n$ denotes an X-coordinate value of an nth touch electrode included in the touch label,
Y denotes the Y-coordinate value of the touch coordinate,
$Y_n$ denotes a Y-coordinate value of the nth touch electrode included in the touch label, and
$W_n$ denotes a touch intensity of the nth touch electrode included in the touch label.

6. The touch sensing device of claim 1, further comprising a noise search circuit configured to search for generation of noise in touch drawing of a continuous touch input using a deviation between a first representative value of a first touch label included in a first frame and a second representative value of a second touch label included in a second frame that is following the first frame.

7. The touch sensing device of claim 6, wherein the noise search circuit determines that noise is generated in the touch drawing when the deviation exceeds a second threshold.

8. A touch sensing method, comprising:
calculating a touch coordinate corresponding to a first touch label of a first frame on the basis of touch intensities of touch electrodes included in the first touch label;
determining whether a touch input corresponding to the touch coordinate is detected in an edge region of a target touch electrode among the touch electrodes;

calculating a first representative value of the first touch label by correcting a maximum touch intensity value of the first touch label on the basis of a coordinate of the target touch electrode and the touch coordinate when the touch input is detected in the edge region of the target touch electrode; and determining the touch input as a normal touch when the first representative value is greater than or equal to a first threshold to output the touch coordinate, wherein, in the calculating of the first representative value:

a touch input deviation ratio is calculated on the basis of a separation distance between an X-coordinate value of the target touch electrode and an X-coordinate value of the touch coordinate, a separation distance between a Y-coordinate value of the target touch electrode and a Y-coordinate value of the touch coordinate, and a pitch value of the target touch electrode; and the maximum touch intensity value is corrected by summing the maximum touch intensity value and a value obtained by multiplying the calculated touch input deviation ratio by the maximum touch intensity value.

9. The touch sensing method of claim 8, wherein a touch electrode having a maximum touch intensity among the touch electrodes is determined as the target touch electrode.

10. The touch sensing method of claim 8, wherein, in the determining operation, when an X-coordinate value of the touch coordinate is different from an X-coordinate value of the target touch electrode or a Y-coordinate value of the touch coordinate is different from a Y-coordinate value of the target touch electrode, it is determined that the touch input is occurred in the edge region of the target touch electrode.

11. The touch sensing method of claim 10, wherein the touch input deviation ratio is calculated using an equation of $$DR = \frac{D_X + D_Y}{2D_P},$$

wherein DR denotes the touch input deviation ratio, $D_X$ denotes a separation distance between the X-coordinate value of the target touch electrode and the X-coordinate value of the touch coordinate, $D_Y$ denotes a separation distance between the Y-coordinate value of the target touch electrode and the Y-coordinate value of the touch coordinate, and $D_P$ denotes a pitch value of the target touch electrode.

12. The touch sensing method of claim 8, wherein, in the calculating of the touch coordinates, an X-coordinate value of the touch coordinate is calculated using an equation of $$X = \frac{\sum_{n=1}^{N} X_n W_n}{\sum_{n=1}^{N} W_n},$$

and a Y-coordinate value of the touch coordinate is calculated using an equation of $$Y = \frac{\sum_{n=1}^{N} Y_n W_n}{\sum_{n=1}^{N} W_n},$$

wherein X denotes the X-coordinate value of the touch coordinate, $X_n$ denotes an X-coordinate value of an nth touch electrode included in the first touch label, Y denotes the Y-coordinate value of the touch coordinate, $Y_n$ denotes a Y-coordinate value of the nth touch electrode included in the first touch label, and $W_n$ denotes a touch intensity of the nth touch electrode included in the first touch label.

13. The touch sensing method of claim 8, further comprising searching for generation of noise in touch drawing of a continuous touch input using a deviation between the first representative value of the first touch label and a second representative value calculated for a second touch label included in a second frame that is following the first frame.

14. The touch sensing method of claim 13, wherein, in the searching for the generation of noise, it is determined that noise is generated in the touch drawing when the deviation exceeds a second threshold.

* * * * *